United States Patent [19]
Dougherty et al.

[11] Patent Number: 5,023,507
[45] Date of Patent: Jun. 11, 1991

[54] TENSION MASK COLOR CATHODE RAY TUBE WITH IMPROVED COLOR SELECTION ELECTRODE SUPPORT STRUCTURE

[75] Inventors: Lawrence W. Dougherty, Sleepy Hollow; William N. Roberts, Niles, both of Ill.

[73] Assignee: Zenith Electronics Corporation, Glenview, Ill.

[21] Appl. No.: 459,034

[22] Filed: Dec. 29, 1989

Related U.S. Application Data

[62] Division of Ser. No. 26,926, Mar. 17, 1987.

[51] Int. Cl.$^5$ ............................................. H01S 29/07
[52] U.S. Cl. ................................................... 313/407
[58] Field of Search ........................ 313/402, 407, 408

[56] References Cited

U.S. PATENT DOCUMENTS

| | | | |
|---|---|---|---|
| 2,842,696 | 7/1958 | Fischer-Colbrie | 313/402 |
| 4,593,224 | 6/1986 | Palac | 313/407 X |
| 4,728,854 | 3/1988 | Fendley | 313/407 |

*Primary Examiner*—Sandra L. O'Shea

[57] ABSTRACT

A color cathode ray tube has a faceplate assembly which includes a flat glass faceplate having on its inner face a centrally disposed phosphor screen. A metal color selection electrode support structure is located on opposed sides of the screen and secured to the inner face. The support structure is secured thereon in tension by meltable filler metal on a planar metal foil color selection electrode.

6 Claims, 3 Drawing Sheets

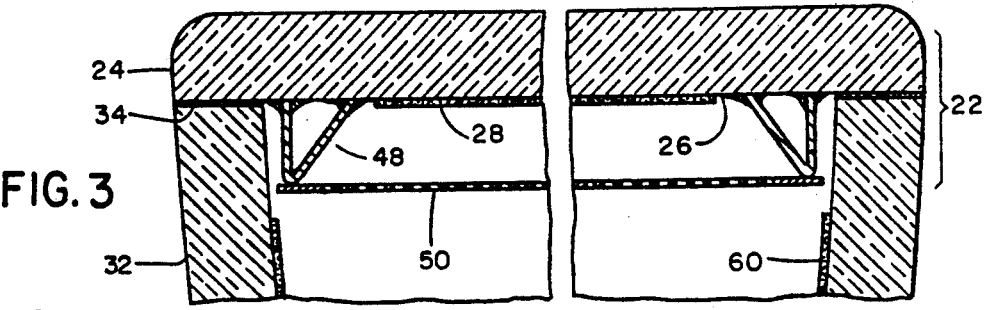
FIG. 3
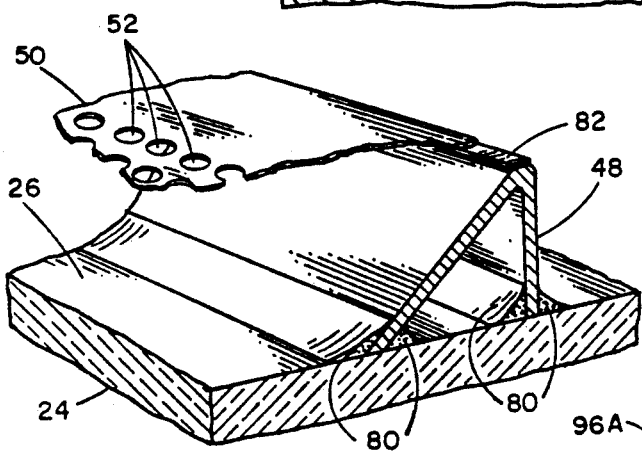
FIG. 4
FIG. 5A
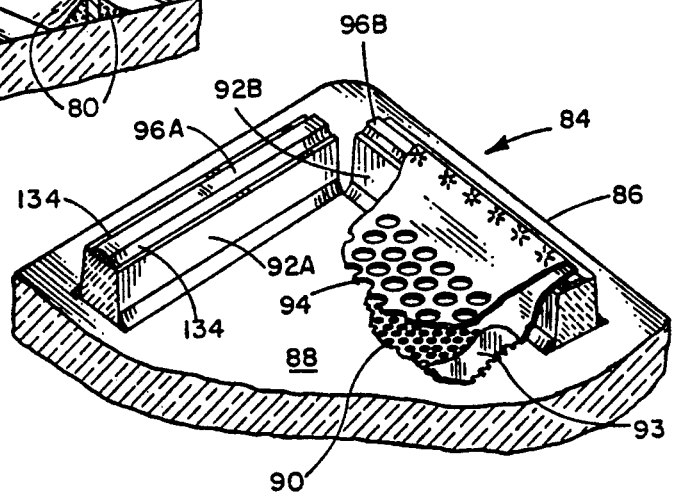
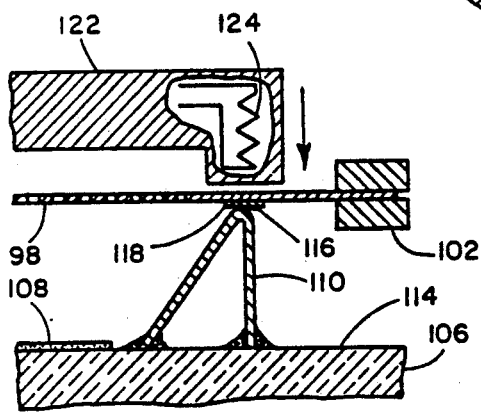
FIG. 7
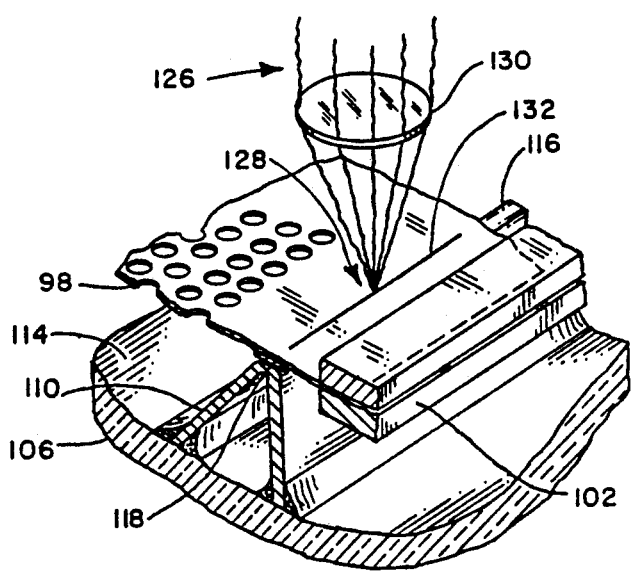
FIG. 8

TENSION MASK COLOR CATHODE RAY TUBE WITH IMPROVED COLOR SELECTION ELECTRODE SUPPORT STRUCTURE

CROSS-REFERENCE TO RELATED APPLICATIONS AND PATENTS

This is a division of application Ser. No. 026,926, filed Mar. 17, 1987.

This application is related to but in no way dependent upon copending applications: Ser. No. 831,699 filed Feb. 21, 1986 (now U.S. Pat. No. 4,686,416); Ser. No. 832,493 filed Feb. 21, 1986 (now U.S. Pat. No. 4,730,143); Ser. No. 832,556 filed Feb. 21, 1986 (now U.S. Pat. No. 4,695,761); Ser. No. 835,845 filed Mar. 3, 1986 (now U.S. Pat. No. 4,725,756); Ser. No. 868,030 filed Apr. 21, 1986 (now U.S. Pat. No. 4,737,681); Ser. No. 894,984 filed Aug. 8, 1986 (now U.S. Pat. No. 4,739,412); Ser. No. 923,934 filed Oct. 29, 1986 (now U.S. Pat. No. 4,783,614); Ser. No. 925,345 filed Oct. 31, 1986 (now U.S. Pat. No. 4,739,217); Ser. No. 925,424 filed Oct. 31, 1986 (now U.S. Pat. No. 4,716,334); Ser. No. 925,656 filed Oct. 29, 1986 (now U.S. Pat. No. 4,728,854); and U.S. Pat. Nos. 4,547,696; 4,591,344; 4,593,224 4,745,330, 4,790,786; and 4,595,857, all of common ownership herewith.

This specification includes an account of the background of the invention, a description of the the best mode presently contemplated for carrying out the invention, and appended claims.

BACKGROUND OF THE INVENTION

Field of the Invention

This invention relates to color cathode ray picture tubes, and is addressed specifically to improved means for attaching a tensed foil color selection electrode to an electrode support structure. The invention is useful in color tubes of various types, including those used in home entertainment television receivers, and in medium-resolution and high-resolution tubes intended for color monitors.

The use of the foil-type flat tension color selection electrode and flat faceplate provides many benefits in comparison to the conventional domed color selection electrode and correlatively curved faceplate. Chief among these is a greater power-handling capability which makes possible as much as a three-fold increase in brightness. The conventional curved color selection electrode, which is not under tension, tends to "dome" in picture areas of high brightness where the intensity of the electron beam bombardment is greatest. Color impurities become visible as the electrode moves closer to the faceplate and as the beam-passing apertures move out of registration with their associated phosphor elements on the faceplate. The tension foil color selection electrode, when heated, distorts in a manner quite different from the conventional color selection electrode. If the entire electrode is heated uniformly, there is no doming and no distortion until tension is completely lost; just before that point, wrinkling may occur in the corners. If only portions of the electrode are heated, those portions expand, and the unheated portions contract, resulting in displacements within the plane of the electrode; i.e., the electrode remains flat.

The tension foil color selection electrode is a part of the cathode ray tube faceplate assembly, and is located in close adjacency to the faceplate. The front assembly comprises the faceplate with its screen which consists of deposits of light-emitting phosphor elements, a color selection electrode, and support means for the electrode. As used herein, the term "color selection electrode" means an apertured metallic foil which may, by way of example, be about one mil thick, or less. The electrode must be supported under tension a predetermined distance from the inner face of the cathode ray tube faceplate; this distance is known as the "Q-distance." As is well known in the art, the color selection electrode, also called a "parallax barrier," ensures that each of the three beams of the color tube lands only on its assigned phosphor elements.

The requirements for a support means for tension foil color selection electrodes are stringent. As has been noted, the foil color selection electrode is normally mounted under high tension. The support means should be of high strength so that the electrode is held immovable; an inward movement of the electrode of as little as one-tenth of a mil is significant in expending guard band. Also, it is desirable that the color selection electrode support means be of such configuration and material composition as to be compatible with the means to which it is attached. As an example, if the support means is attached to glass, such as the glass of the inner face of the faceplate, the support means should have a coefficient of thermal expansion compatible with the glass, and by its composition, be bondable to glass. Also, the support means should be of such composition and structure that the color selection electrode can be secured to it by production-worthy techniques. Further, it is essential that the support means provide a suitable surface for mounting and securing the electrode. The material of which the surface is composed should be adaptable to machining or other forms of shaping so that it can be contoured into near-perfect flatness so that no voids between the metal of the electrode and the support structure can exist to prevent the positive, all-over contact required for proper electrode securement.

A present means for installing a color selection electrode is to stretch or otherwise expand an in-process color selection electrode across a metal faceplate-mounted frame by suitable tensioning means. The electrode is expanded across the frame and can be secured to the frame by processes such as laser welding, and electrical resistance, or "spot" welding. In a 14-inch tube, for example, more than 1000 such welds at intervals of about 0.040 inch are required around the circumference of the frame to ensure positive securement of the electrode. A disadvantage of spot welding by laser beam welding and electrical resistance is that the securement of the electrode is at intermittent locations, rather than along a continuous, uninterrupted line. Laser spot welding is also sensitive to an irregular contour of the electrode mounting surface, which can produce unweldable gaps between the electrode and the mounting surface. Variance in electrode thickness can also be a detriment to laser spot welding. Another factor adversely affecting both welding means is vulnerability to the presence of contaminants such as PVA, grille dag, and oxides, which can affect the integrity of the weldments. A further disadvantage in both types of welding is the intensity of the heat that must be applied at the weld; e.g., 2,800 degrees F.—a temperature level which can anneal and weaken the hardened metal of the electrode not only at the point of the weld, but over an appreciable area in the vicinity of the weld. The effect can be an appreciable loss of tension of the electrode originating at the points of attachment in peripheral areas of the electrode. As a result, color purity of the image can be affected.

A continuous roller or "seam" weld accomplished by electrical resistance can provide a continuous weld; however, as with laser and spot welding, the intensity of the heat applied at the weld line would tend to anneal and thus weaken the electrode in the peripheral areas, leading to loss of tension.

In U.S. Pat. No. 2,842,696 to Fischer-Colbrie, a color cathode ray tube is disclosed in which a color selection electrode consists of a grid of wires stretched in parallelism with a flat faceplate. In one embodiment of the invention, the ends of the wires are held in place and taut by means of an electrically conductive cement consisting of a mixture of powdered aluminum silicate and aluminum phosphate in a paste-forming medium of a dilute water solution of phosphoric acid. Also described is a means of bonding in which the ledges that receive the wires of a wire-type electrode are (to quote) ". . . suitably metallized in a well-known manner in which case the bonds can be 'metallic or metal-to-metal'." No particulars as to this means of bonding are disclosed.

Bonding of metals is described in a book titled *Capillary Joining—Brazing and Soft-Soldering*, by C. J. Thwaites. (Research Studies Press, John Wiley & Sons, Ltd. 1982.)

OBJECTS OF THE INVENTION

It is an object of this invention to provide a color cathode ray tube having improved means for the securement of a tensed foil color selection electrode to an electrode support structure.

It is an object of the invention to provide for the higher-strength securement of a tensed foil color selection electrode to an electrode support.

It is another object of the invention to provide means for the securement of a tensed foil color selection electrode that will exceed the strength of securement obtainable by spot welding means.

It is a further object of the invention to provide a viable and less costly substitute for spot welding as a means for the securement of a tensed foil color electrode to an electrode support.

It is yet another object of the invention to provide a means and process that is capable of a continuous line of securement of a tensed foil color selection electrode, rather than by an intermittent series of spots characteristic of spot welding.

It is another object of the invention to provide more effective means for attaching together the dissimilar metals of a hardened carbon steel color selection electrode and a stainless steel alloy electrode support structure.

It is a further object of the invention to provide means for the securement of a tensed foil color selection electrode that has a minimally adverse effect on the metallurgical properties of the metal of the electrode;

It is yet another object of this invention to provide improved means for securing a foil color selection electrode to an electrode support that will enable the mounting of the electrode under higher tension than is possible with an electrode secured by spot-welding means.

It is a further object of the invention to provide color selection electrode securement means that will contribute to the enhancement of the anti-doming effect that is a salient characteristic of the tensed foil color selection electrode.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

FIG. 3 is sectioned view in elevation of the tube faceplate assembly shown by FIG. 1, and indicating in greater detail the location and orientation of the color selection electrode in relation to other faceplate assembly components following its securement to the electrode support structure by the means and process according to the invention; the configuration of a color selection electrode support structure depicted is not the subject of the present invention, but is fully described and claimed in referent copending application Ser. No. 831,699 now U.S. Pat. No. 4,686,416;

FIG. 4 is a perspective view of a section of the support structure shown by previous figures, and indicating details the improved tensed foil color selection electrode securement means according to the invention;

FIG. 5A is a view in perspective of a corner section of the ceramic color selection electrode support structure shown by FIG. 5;

FIG. 7 is a sectional view in elevation indicating diagrammatically the means and process according to the invention for securing a tensed foil color selection electrode to an electrode support structure; and FIG. 8 is an oblique view in perspective of the color selection electrode support structure shown by FIG. 7, depicting another means according to the invention for securement of a tensed foil color selection electrode.

DESCRIPTION OF THE PREFERRED EMBODIMENT

Figure 1:
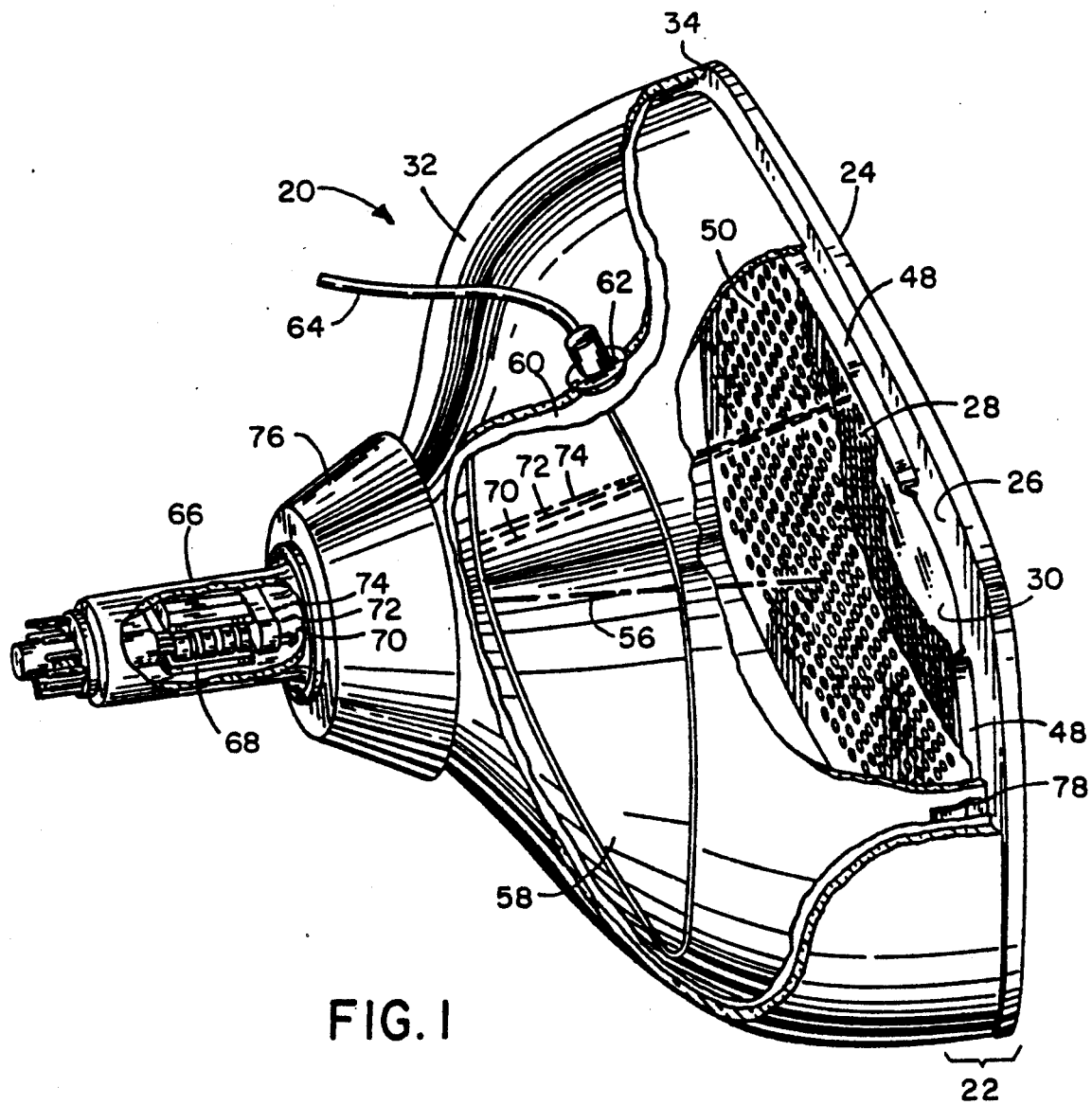
FIG. 1 is a side view in perspective of a color cathode ray tube having a tensed foil color selection electrode secured by the means and process according to the invention, with cut-away sections that indicate the location and relationship of the color selection electrode and the support structure on which the electrode is mounted with major components of the tube; an inset indicates the apertures used in the color selection function.
Figure 2:
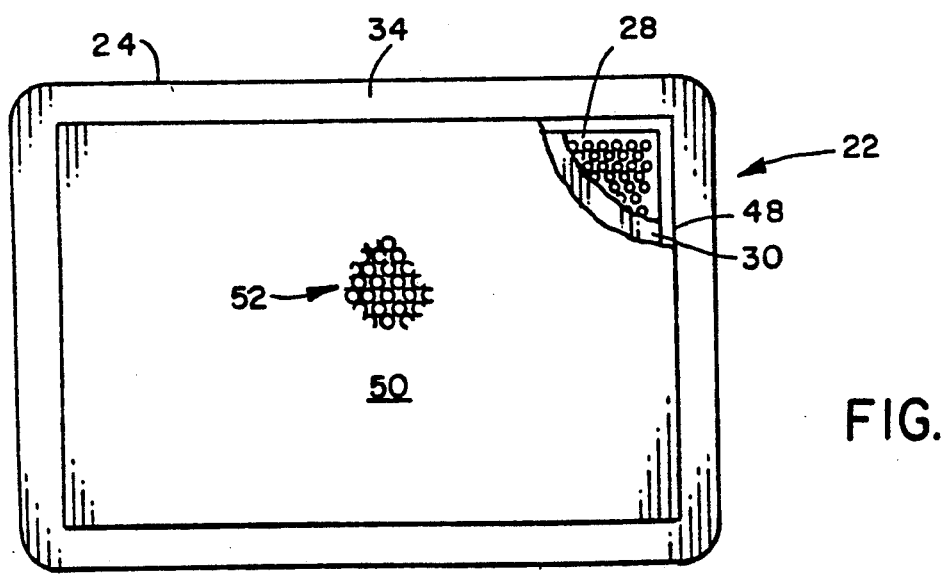
FIG. 2 is a plan view of the front assembly of the tube shown by FIG. 1 as viewed from the electron gun end of the tube, with parts cut away to show the relationship of the electrode support structure shown by FIG. 1 with the faceplate and the color selection electrode.

A color cathode ray tube having improved securement means for a tensed foil color selection electrode according to the invention, and with the color selection electrode secured thereto according to the inventive process, is depicted in FIG. 1. The tube and its component parts are identified and described in the following paragraphs in this sequence: reference number, a reference name, and a brief description of structure, interconnections, relationship, functions, operation, and/or result, as appropriate. It is to be noted that the drawings are not necessarily to scale.

WITH INITIAL REFERENCE TO FIGS. 1, 2 AND 3

20: color cathode ray tube
22: faceplate assembly, which ultimately is made an integral part of the tube envelope at the final assembly of the tube. The faceplate assembly includes
24: a flat glass faceplate
26: inner face of faceplate which receives the phosphor screen
28: centrally disposed phosphor screen
30: film of reflective aluminum
32: funnel
34: peripheral sealing area of faceplate, adapted to mate with the funnel
48: metal color selection electrode support structure located on opposed sides of the screen 28 and secured to the inner face 26. The metal of the structure is preferably a stainless steel alloy manufactured by Carpenter Technology, Inc., of Reading, Pa., under the designation Alloy No. 27.
50: a metal foil color selection electrode secured in tension on color selection electrode support structure 48
52: apertures in color selection electrode 50, indicated schematically and not to scale; apertures are used in the color selection function
56: anterior-posterior axis of tube
58: internal magnetic shield—"IMS"
60: internal conductive coating on funnel
62: anode button
64: high-voltage conductor
66: neck of tube
68: in-line electron gun providing three discrete in-line electron beams for exciting the triads of phosphor elements deposited on screen 28
70, 72, 74: electron beams for activating respective red-light-emitting, green-light emitting, and blue-light-emitting phosphor elements on screen 28
76: yoke which provides for the traverse of beams 70, 72 and 74 across screen 28
78: contact spring which provides an electrical path between the internal conductive coating 60 of funnel 32 and the color selection electrode support structure 48.

With reference to FIG. 4, there is depicted in greater detail a section the color selection electrode support structure 48 shown by previous figures. Support structure 48 is indicated as being secured to the inner face 26 of faceplate 24 by beads of frit 80. According to the invention, color selection electrode support structure 48, depicted symbolically as being metal, has secured thereon by filler metal means 82 a metal foil color selection electrode 50 in tension. Filler metal means comprises, in one embodiment of the invention, an alloy having a solidus temperature above the frit-cycle temperature, but below the threshold of the annealing temperature of the metal of the electrode. The frit-cycle temperature is noted as being the maximum temperature required for proper frit sealing of the glass components of the tube envelope in final tube assembly—a temperature of about 435 degrees C.

The threshold of the annealing temperature of the hardened metal of the electrode is about 500 degrees C. Preferably, the solidus temperature of the filler metal, noted as being above the frit-cycle temperature, is a temperature on the order of 450 degrees C., and the liquidus temperature, noted as being below the threshold of the annealing temperature of the electrode, is a temperature on the order of 485 degrees C. Securement of the color selection electrode to the support structure within this range of temperature is preferred in that it is essential that the hardness of the electrode material not be significantly reduced, and that the electrode tensile strength be maintained at a high level in order that many tens of thousands of pounds per square inch of tension can be applied to the electrode. If an electrode was significantly annealed by relatively long subjection to temperatures in the range of 500 to 700 degrees C., by way of example, the tensile strength of the metal of the electrode would be undesirably reduced. By staying below the threshold of the annealing temperature of the metal, little or no annealing occurs. So securement of the electrode by relatively low melting point filler metal is preferable.

A formula for filler metal means that offers the necessary properties is as follows: 82 Au-18 In. The liquidus state of this filler metal means is 485 degrees C., and the solidus state is 451 degrees C. Another suitable formula comprises a composition (in weight-percent) of 98% zinc and 2% nickel, a composition that has a solidus temperature of 419 degrees C., and a liquidus temperature of 550 degrees C. Although the liquidus temperature of this composition is somewhat higher than the threshold of the annealing temperature of the metal of the electrode, use of this formula is considered to be acceptable.

It is, however, entirely feasible, and in accord with the invention, to secure a tensed foil electrode to a support structure by the utilization of filler metals that melt at temperatures that substantially exceed the threshold of the annealing temperature of the hardened metal of the color selection electrode; e.g., in the range of 600 to 800 degrees C. For example, a filler metal means having a solidus temperature of about 600 degrees C., and a liquidus temperature of about 680 degrees C. can be used. There is a proviso, however, in that the heat for melting the filler metal must be applied according to the invention; that is, localized to the electrode-receiving surface of the electrode support structure, and to the surface of the electrode that engages the support structure. Also, and in accord with the invention, it is preferable that the heat be "applied" in a continuous line effective to melt the filler metal means, with minimal annealing of the hardened metal of the electrode. A suitable filler metal means having a liquidus temperature well above the threshold of the annealing temperature of the hardened metal of a foil color selection electrode comprises the alloy according to the AWS classification BAg-1 (45% Ag; 15% Cu; 15% Zn; and 24% Cd). The solidus temperature is about 607 degrees C., and the liquidus temperature is about 618 degrees C. In general it can be said that filler metal means that melt at higher temperatures supply a proportionally greater strength in securement.

Figure 5:
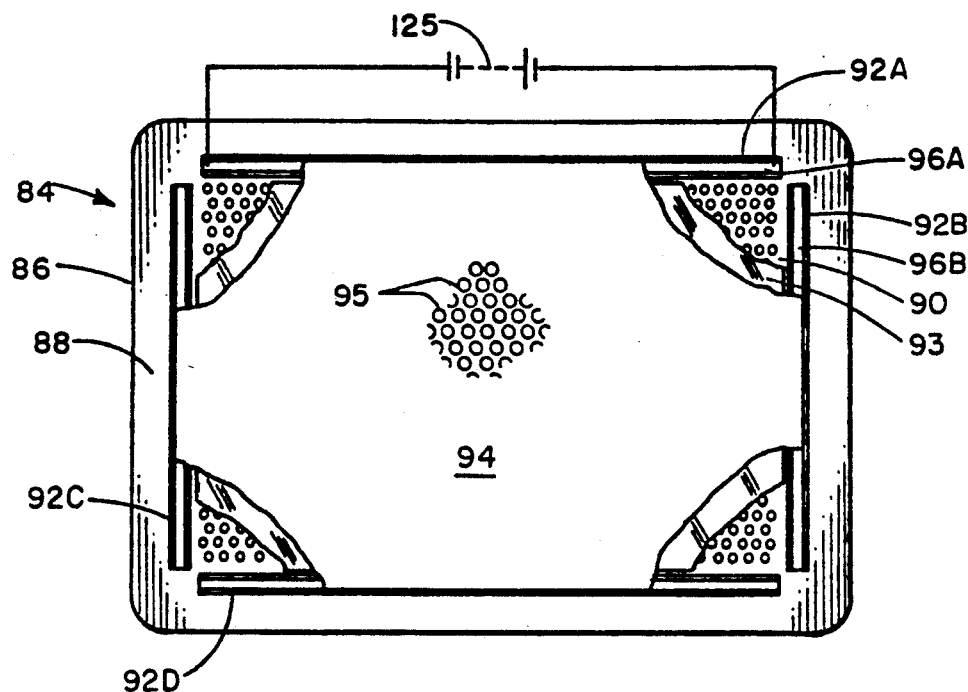
FIG. 5 is a plan view of a faceplate assembly as viewed from the electron gun end of the tube, with cutaway sections depicting ceramic color selection electrode support means.
Figure 6:
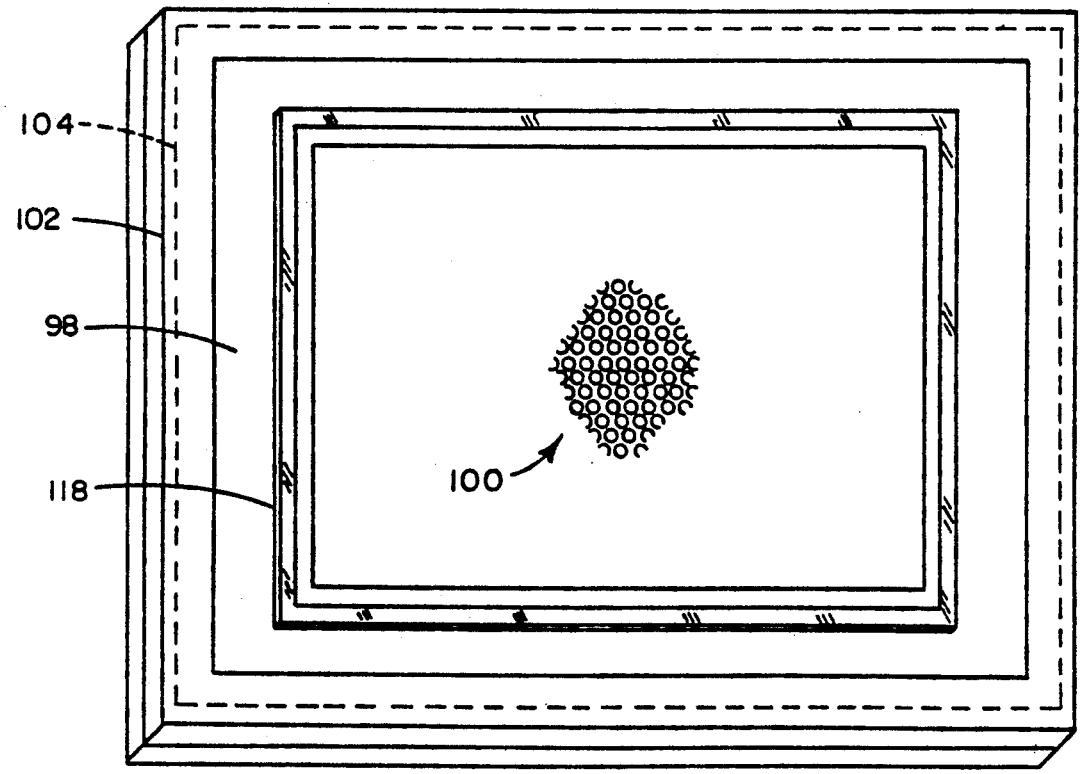
FIG. 6 is a diagrammatic plan view of an in-process color selection electrode depicted as being mounted in a temporary, two-piece electrode-mounting frame; an inset indicates the apertures used for the color selection function.

A faceplate of a color cathode ray tube having improved securement means for a tensed foil color selection electrode according to the invention is depicted in FIGS. 5 and 5A. The support structure depicted is described and claimed in referent copending application Ser. No. 868,030, now U.S. Pat. No. 4,737,681, of common ownership herewith. A faceplate assembly 84, which ultimately is made an integral part of the tube envelope at the final assembly of the tube, includes a glass faceplate 86 having on its inner face 88 a centrally disposed phosphor screen 90 covered with an aluminum film 93. The electrode support structure in this embodiment is depicted as comprising four discrete sections: section 92A, 92B, 92C and 92D located on opposed sides of screen 90 and secured to the inner face 88. The electrode support structure is indicated symbolically as being comprised of a ceramic material. Each of the sections 92A-D is indicated as having a metal crown—depicted as being discrete units, crowns 96A, 96B, 96C and 96D, respectively. Two of the sections—section 92A and section 92B with respective metal crowns 96A and 96B—are depicted in greater detail in the FIG. 5A corner view. The sections and the respective metal crowns are represented as having secured thereon in tension by filler metal means a metal foil color selection electrode 94, noted as being hardened. The metal comprising the crowns is preferably the aforedescribed Carpenter Alloy No. 27, described as being a stainless steel alloy. As in the case of the previously described electrode support structure of metal, securement of the electrode to the crown of the ceramic support is preferably by filler metal means having a solidus temperature above the frit-cycle temperature, and a liquidus temperature below the threshold of the annealing temperature of the hardened metal of the color selection electrode. Prior to the securement of the electrode according to the invention, the in-process color selection electrode is first expanded to full tension on a reusable factory fixture frame and clamped securely thereto. A suitable frame is fully described and claimed in U.S. Pat. No. 4,790,786. The in-process electrode and its attachment to the frame is indicated highly schematically in FIG. 6, wherein there is depicted a in-process color selection electrode 98 having a central field of apertures 100, as indicated in enlarged form by the inset. The in-process electrode 98 is represented as being clamped in a frame 102; the edge 104 of the electrode is indicated by the dashed line. The in-process electrode 98 is placed in tension in the frame by expanding it by means of heated platens, or by stretching it mechanically. The frame 102 with the captivated electrode 98 is then placed in a lighthouse, the function of which is well known to those skilled in the art. An in-process flat glass faceplate that is "blank"; that is, one having no centrally located phosphor screen on its inner face, is located in exact registry with the frame 102 and the captivated electrode 98. The faceplate is then screened through the tensed electrode by the well-known photoscreening process to deposit the matrix, and the red, green and blue phosphor elements. Upon completion of the photoscreening process, the in-process electrode, still captivated in tension in the frame 102, is secured to the color selection electrode support structure by the process according to the invention.

A process according to the invention for use in the manufacture of a color cathode ray tube is described in the following paragraphs, with reference to FIG. 7:

an in-process flat glass faceplate 106 is provided that has on its inner face 114 a centrally located phosphor screen 108;

a metal color selection electrode support structure 110 is provided that has an electrode-receiving surface 116; the structure is secured to the inner face 114 of the faceplate 106 on opposed sides of the screen 108;

a foil color selection electrode 98 composed of hardened metal is provided which has a surface for engaging the electrode-receiving surface 116 of the support structure 110;

filler metal means is inserted between the surfaces; preferably, the electrode-receiving surface of the support structure is "preconditioned" by filler metal means wherein preconditioning is defined as the "tinning" of the electrode-receiving surface with filler metal means. The surface of the electrode engaging the support structure may also be preconditioned with filler metal means; this preconditioning is depicted as a "racetrack" 118 in FIG. 6;

the color selection electrode 98 is expanded and the surfaces 116 and 118 are placed in conjunction;

heat is applied to the surfaces by means effective to melt the filler metal means with minimal annealing the hardened metal of the electrode;

the filler metal means is then cooled to permanently secure the color selection electrode in tension on the support structure.

"Preconditioning" comprises a preparatory step in which the surfaces to be joined are coated with a thin layer of the filler metal means used to join the parts together. This process is also known in the art as "tinning." The area of the parts to be secured together, in this case the electrode-receiving surface 116 of support structure 108 and the "racetrack" 118 of electrode 98, are heated to the proper temperature and coated with filler metal means. In the application of the racetrack 118 depicted in FIG. 6 to electrode 98, the electrode is first heated to a suitable temperature for acceptance of the filler metal by the metal of the electrode; this temperature is preferably below the threshold of the annealing temperature of the metal of the electrode. The filler metal means is then applied, by way of example, with a tool in the form of a wheel which is rolled over the surface to be preconditioned. With regard to the preconditioning of the surface 116 of support structure 110 shown by FIG. 7, before the support structure 110 is secured to the faceplate 106, the structure can, by way of example, be heated to temperature at which the filler metal means will be accepted, and the surface 116 can be dipped in a bath of the desired alloy to a depth sufficient to attach a thin coat of filler metal means to surface 116.

To enhance adherence of the filler metal means to the metal of the metal foil color selection electrode, and to the metal of the support structure, a layer of another metal; that is, a metal other than the filler metal means, may be applied to the surfaces to be joined before the surfaces are preconditioned. A metal to enhance adherence of the filler metal means according to the invention preferably comprises nickel applied in a very thin coat to surface 118 of electrode 98, and the electrode-receiving surface 116 of support structure 110. The application of nickel may obviate the use of a highly corrosive flux necessary for removing oxides that may form on the surface of Carpenter Alloy No. 27, noted as being an alloy of stainless steel; removal of such a flux could present problems during production. The nickel can be applied by any of a number of deposition techniques, such as electroless or electro-plating, or sputtering. To prevent corrosion of the coated surfaces while in inventory, the nickel in turn can be coated with yet another metal effective to inhibit corrosion, such as a flash of gold.

In lieu of flux, a forming gas may be used to remove oxides from the parts to be preconditioned. A suitable forming gas comprises a mixture of 85 percent nitrogen and 15 percent hydrogen. The gas is introduced into a chamber holding the parts to be preconditioned only as long as necessary to accomplish oxide reduction. When the surface oxides of the parts are reduced, the gas is then purged from the chamber.

The preconditioning filler metal means could as well be applied in the form of a screen-printable paste. Such pastes are fluxless, are compatible with the inner environment of the cathode ray tube, and have the inherent strength necessary for securing the electrode in tension to the support structure. The printable application technique lends itself especially well to production. A suitable screen-printable paste is alloy ESL #2323, copper/silver (28/72) "BT", manufactured by Electro-Science Laboratories, Inc. of King of Prussia, Pa. The alloy is usable with both the stainless steel of the color selection electrode support, and the hardened carbon steel of the electrode. Screen-printable pastes supplied by other manufacturers could as well be used.

Further with regard to the process according to the invention, and with reference to FIG. 7, the electrode having been tensed, the preconditioned surfaces—surface 116 of electrode support 108, and surface 118 of electrode 98, are placed in conjunction. Heat is then applied which is effective to melt the filler metal means, after which the filler metal means is cooled to permanently secure the color selection electrode 98 in tension on the support structure 108. The means of heating depicted diagrammatically in FIG. 7 comprises a heated platen 122 wherein the platen is indicated as contacting electrode 98 over the area of conjunction of the respective preconditioned surfaces 118 and 120. (Platen 122 is noted as contacting the entire area of the preconditioned surfaces.) The heat of platen 122 is indicated symbolically as being supplied by a an electrically resistive element 124. The heat could as well be supplied by a heated roller (not shown) which progressively contacts the electrode 98 in a continuous line over the areas of the preconditioned surfaces. Also, the necessary heat could as well be supplied by induction means.

Heat could also be supplied by resistive heating resulting from an electrical current flowing through the support structure. This concept is depicted in FIG. 5 wherein the metal crown 96A of ceramic support structure 92A is indicated highly schematically as receiving an electrical current from battery 125. This means of heating can be of particular value when used with the ceramic support structure as only the metal crown will be heated. As a result, the heat generated will be localized at the line of weld and little will be radiated or otherwise conducted to the glass of the faceplate.

An alternate means for providing heat effective to melt the filler metal means may be applied by means of a laser beam focused through the color selection electrode. This means is indicated FIG. 8 wherein a laser beam 126 is depicted as applying heat in the form of radiant energy through the color selection electrode 98 of the front assembly configuration shown by FIG. 7. The heat is preferably localized to a small area 128 by the focusing of the light energy through a lens 130. It is to be noted that the laser beam is used only to melt the filler metal means through the metal of the electrode, and that a laser beam of much lower intensity can be used than if the electrode were actually being welded to the support structure by the laser beam; in welding, a temperature of about 2,800 degrees F. is required. Because of the lower intensity of the laser beam required to melt the filler metal means, and hence a much lower temperature; i.e., on the order of 1,000 degrees F., there is, unlike welding, minimal annealing of the metal of the electrode impacted by the laser beam, and hence little or no distortion of the electrode at its periphery. There is yet another advantage, and this over spot welding means such as either by laser or by electrical spot welding, and that is the fact the securement is in a continuous line, as indicated by line 132, rather than comprising a successive series of discrete "spot" welds. Hence there will be more uniform edge support of the electrode, and the highly localized stress at individual spots due to welding will be avoided. As a result, the electrode can be tensed to a higher level without fear of rupture. It is noted that a higher tension enhances the anti-doming effect that is a salient characteristic of the foil color selection electrode. A further advantage of the process according to the invention is that the support structure can be salvaged in case of problem in mounting, as the parts can easily be separate by reheating, and the surfaces can easily be preconditioned ready for another attempt at joining. When heating filler metal having a liquidus temperature above the threshold of the annealing temperature of the electrode, the heat must be strictly localized to the area of the melt. Otherwise, if the heating is not localized, the heat, either radiated or conducted, can adversely affect the optical characteristics of the nearby glass of the faceplate. By its ability to localize the heat applied, the application of heat by platen or by laser beam according to the invention is preferred.

To provide adequate strength in the securement of the color selection electrode, a quantity of filler metal in addition to that comprising the relatively thin coating on the preconditioned surfaces of the electrode and the support structure may be required. The additional filler metal may be pre-formed, for example, on the surface 118 of electrode 98, and/or the electrode-receiving surface 116 of support structure 110.

The metal crowns 96A and 96B depicted in FIG. 5A are depicted as being secured to the respective ceramic color selection electrode supports 92A and 92B by means of fillets of cement 134. (Crowns 96C and 96D depicted in FIG. 5 are similarly attached to their respective supports.) The melting point of the means of attachment of the crown to the ceramic must of course be higher than the liquidus temperature of the filler metal means. The cement may comprise a devitrifying glass frit. It is a characteristic of this type of frit that upon being heated to a specified temperature, the frit first melts, then crystallizes at the melting temperature to become a solid glass adhesive or cement immune to further melting—a state in which it continues even though it is again heated to the specified temperature. Frits of this type can be compounded to provide devitrification at temperatures at which they would be largely immune to the temperatures necessary to melt the filler metal means. As a result, the crowns would remain adhered to the underlying ceramic support during the process of color selection electrode securement according to the invention.

While a particular embodiment of the invention has been shown and described, it will be readily apparent to those skilled in the art that changes and modifications may be made in the inventive means and process without departing from the invention in its broader aspects, and therefore, the aim of the appended claims is to cover all such changes and modifications as fall within the true spirit and scope of the invention.

What is claimed is:

1. A color cathode ray tube having a faceplate assembly including a flat glass faceplate having on its inner face a centrally disposed phosphor screen, and a metal color selection electrode support structure located on opposed sides of said screen and secured to said inner face, said support structure having secured thereon by meltable filler metal means a planar metal foil color selection electrode in tension.

2. A color cathode ray having a faceplate assembly including a flat glass faceplate having on its inner face a centrally disposed phosphor screen, and a metal color selection electrode support structure having an electrodereceiving surface secured to said inner face on opposed sides of said screen, said support structure having secured in tension thereon by meltable filler metal means a foil color selection electrode of hardened metal, said filler metal means comprising an alloy having a solidus temperature above the frit-cycle temperature, but below the threshold of the annealing temperature of the hardened metal of said color selection electrode.

3. A color cathode ray having a faceplate assembly including a flat glass faceplate having on its inner face a centrally disposed phosphor screen, and a metal color selection electrode support structure having an electrode-receiving surface secured to said inner face on opposed sides of said screen, said support structure having secured in tension thereon by meltable filler metal means a foil color selection electrode of hardened metal, said filler metal means comprising an alloy having a liquidus temperature above the annealing temperature of the hardened metal of said color selection electrode.

4. A color cathode ray having a faceplate assembly including a flat glass faceplate having on its inner face a centrally disposed phosphor screen, and a ceramic color selection electrode support structure located on opposed sides of said screen and secured to said inner surface, said support structure having a metal crown having secured thereon in tension by meltable filler metal means a foil color selection electrode of hardened metal, said filler metal means comprising an alloy having a solidus temperature above the frit-cycle temperature, and a liquidus temperature below threshold of the annealing temperature of the hardened metal of said color selection electrode.

5. The color cathode ray tube according to claim 4 wherein said solidus temperature of said alloy means is a temperature on the order of 450 degrees Centigrade, and said liquidus temperature is a temperature on the order of 480 degrees Centigrade.

6. A color cathode ray having a faceplate assembly including a flat glass faceplate having on its inner face a centrally disposed phosphor screen, and a ceramic color selection electrode support structure located on opposed sides of said screen and secured to said inner surface, said support structure having a metal crown having secured thereon in tension by meltable filler metal means a foil color selection electrode of hardened metal, said filler metal means comprising an alloy having a liquidus temperature above the threshold of the annealing temperature of the hardened metal of said color selection electrode.

* * * * *